(12) United States Patent
Yasutomi

(10) Patent No.: US 10,129,437 B2
(45) Date of Patent: Nov. 13, 2018

(54) IMAGE PROCESSING APPARATUS, IMAGE PROCESSING METHOD, RECORDING MEDIUM, AND PROGRAM

(71) Applicant: Ricoh Company, Ltd., Tokyo (JP)

(72) Inventor: Kei Yasutomi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 70 days.

(21) Appl. No.: 15/504,798

(22) PCT Filed: Aug. 19, 2015

(86) PCT No.: PCT/JP2015/004147
§ 371 (c)(1),
(2) Date: Feb. 17, 2017

(87) PCT Pub. No.: WO2016/031189
PCT Pub. Date: Mar. 3, 2016

(65) Prior Publication Data
US 2017/0244867 A1   Aug. 24, 2017

(30) Foreign Application Priority Data

Aug. 25, 2014  (JP) .................. 2014-170387

(51) Int. Cl.
*H04N 1/00* (2006.01)
*H04N 1/60* (2006.01)
*H04N 9/64* (2006.01)

(52) U.S. Cl.
CPC ......... *H04N 1/6005* (2013.01); *H04N 1/6027* (2013.01); *H04N 9/646* (2013.01)

(58) Field of Classification Search
CPC ................ H04N 1/00–1/648; G06T 5/00–5/50
See application file for complete search history.

(56) References Cited

U.S. PATENT DOCUMENTS 7,643,179 B2   1/2010   Yasutomi
7,746,502 B2   6/2010   Yasutomi et al.
(Continued)

FOREIGN PATENT DOCUMENTS

JP   2003-101795   4/2003
JP   2003-134352   5/2003
(Continued)

OTHER PUBLICATIONS

International Search Report dated Nov. 2, 2015 in PCT/JP2015/004147 filed on Aug. 19, 2015.

*Primary Examiner* — Sean T Motsinger
(74) *Attorney, Agent, or Firm* — IPUSA, PLLC

(57) ABSTRACT

An image processing apparatus includes a color separation unit separating image data into a luminance component and a color component; a processing unit generating second image data of the luminance component by manipulating pixel values of multi-resolution image data generated from first image data of the luminance component and reconstructing the manipulated multi-resolution image data; and a composition unit compositing the second image data of the luminance component with image data of the color component. Further, the processing unit generates the second image data of the luminance component based on pixel values which are adjusted by using parameters in accordance with pixel values of the image data of the color component.

11 Claims, 10 Drawing Sheets

(56) References Cited

U.S. PATENT DOCUMENTS

| | | |
|---|---|---|
| 8,553,287 B2 | 10/2013 | Yasutomi et al. |
| 8,736,723 B2 | 5/2014 | Tsuruoka |
| 9,058,640 B2 | 6/2015 | Manabe |
| 9,323,490 B2 | 4/2016 | Yasutomi |
| 2004/0252907 A1* | 12/2004 | Ito .......................... H04N 1/58 |
| | | 382/260 |
| 2009/0169102 A1* | 7/2009 | Zhang .................. G06T 3/4061 |
| | | 382/167 |
| 2010/0008574 A1* | 1/2010 | Ishiga .................... H04N 5/357 |
| | | 382/167 |
| 2010/0066874 A1* | 3/2010 | Ishiga .................... G06T 5/002 |
| | | 348/252 |
| 2010/0208105 A1 | 8/2010 | Kubota |
| 2011/0199542 A1 | 8/2011 | Hirai |
| 2013/0335438 A1* | 12/2013 | Ward ....................... G06T 5/40 |
| | | 345/589 |
| 2017/0244867 A1* | 8/2017 | Yasutomi ............. H04N 1/6005 |
| 2018/0089810 A1* | 3/2018 | Hirai ....................... G06T 5/009 |

FOREIGN PATENT DOCUMENTS

| | | |
|---|---|---|
| JP | 2005-244710 | 9/2005 |
| JP | 2007-142670 | 6/2007 |
| JP | 2014-068330 | 4/2014 |

\* cited by examiner

[Fig. 1]
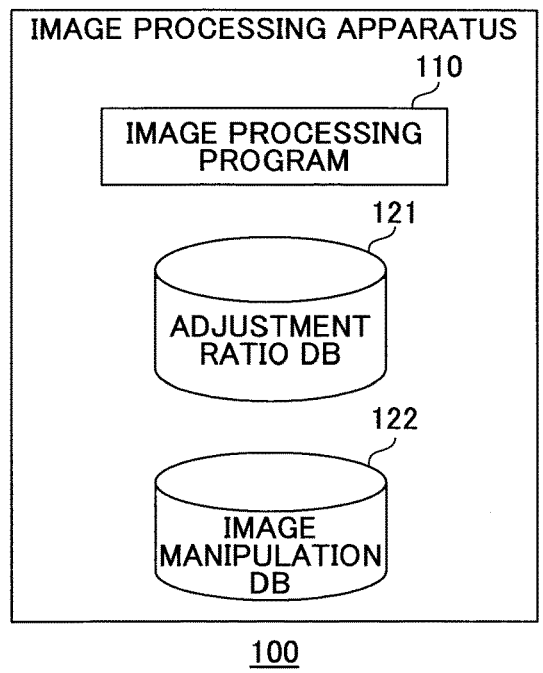
[Fig. 2]
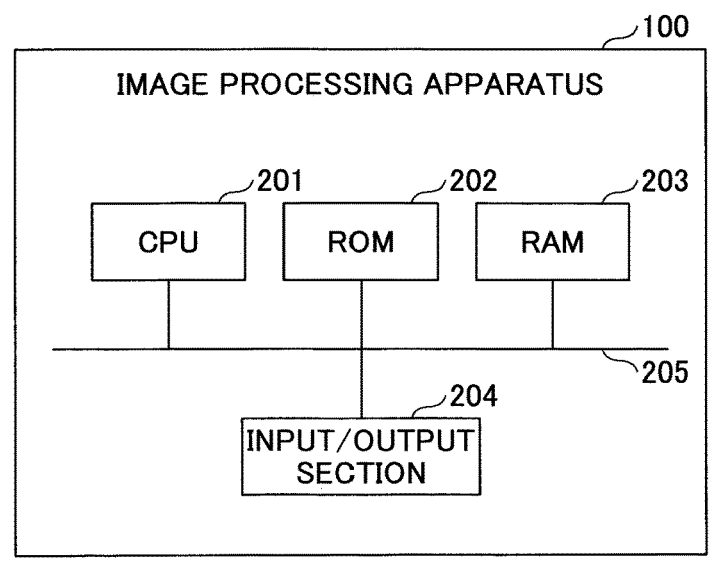

[Fig. 3]
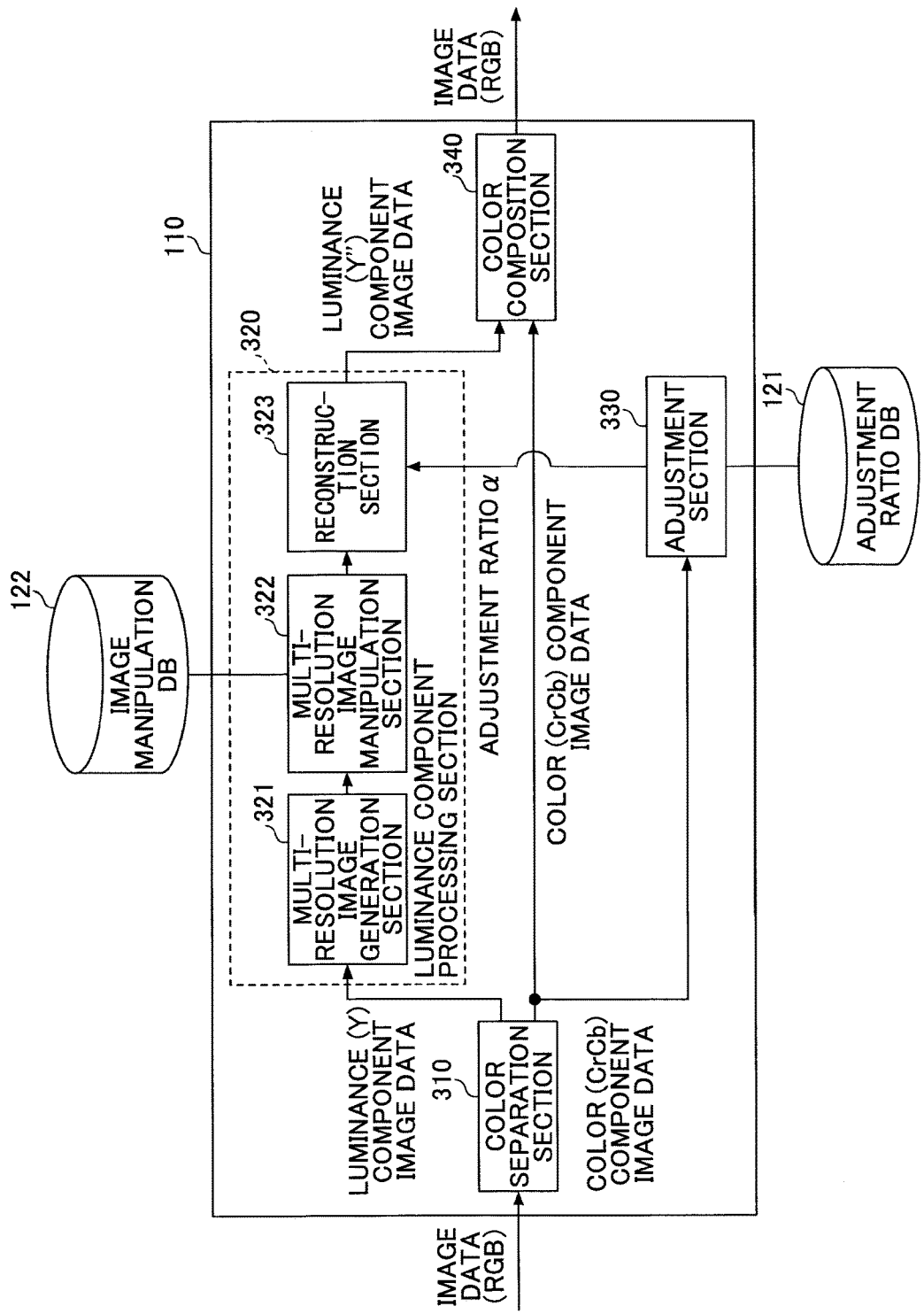

[Fig. 4]
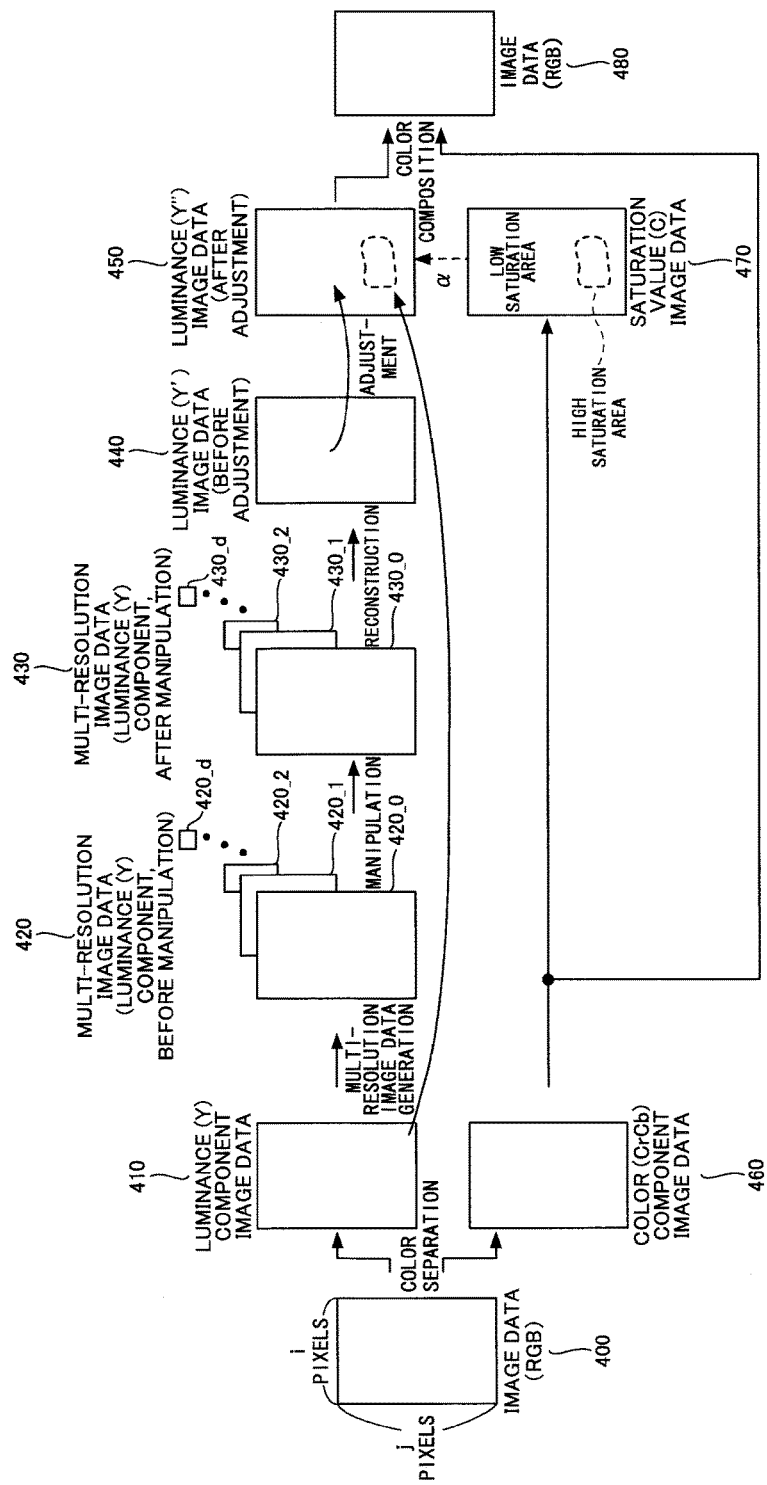

[Fig. 5]
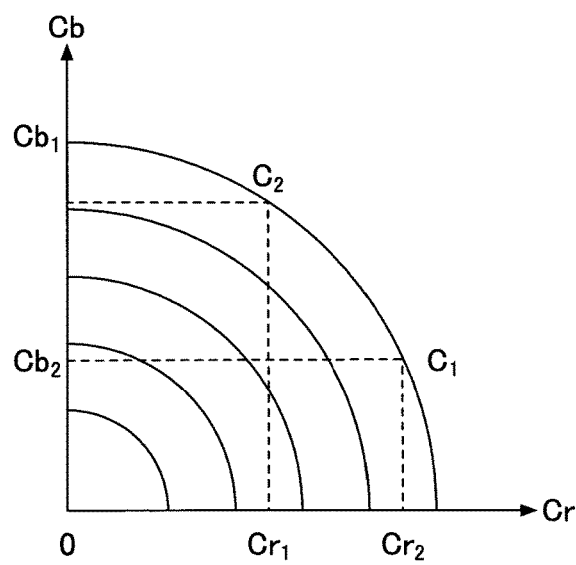
[Fig. 6]
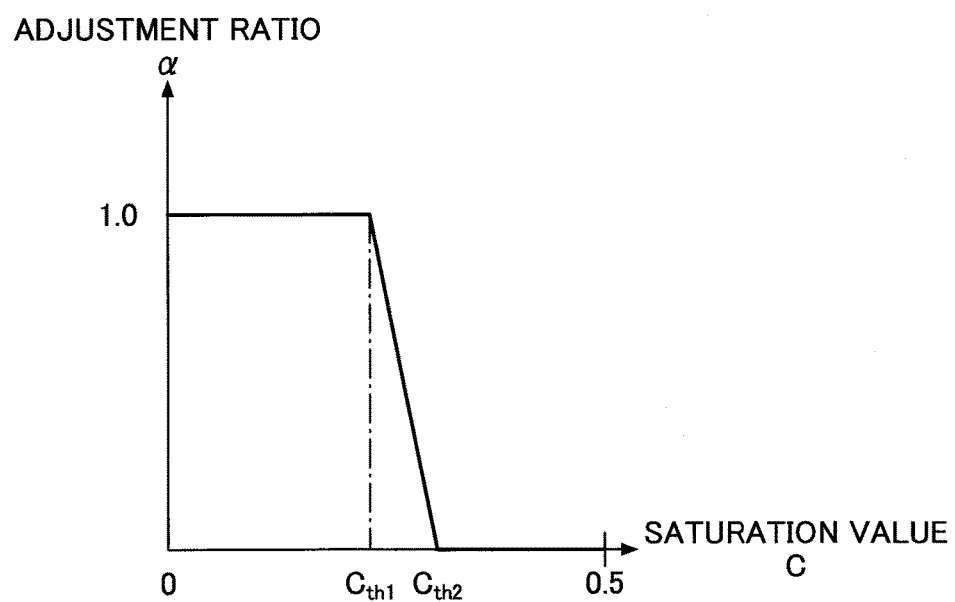

[Fig. 7]
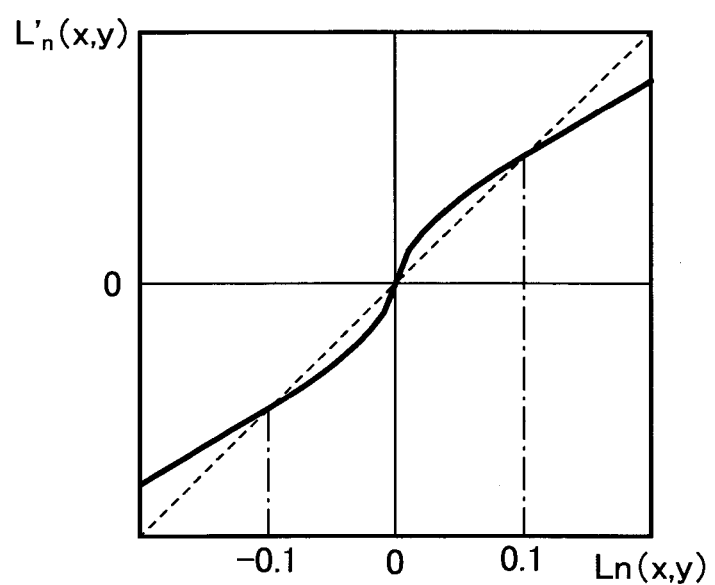

[Fig. 8]
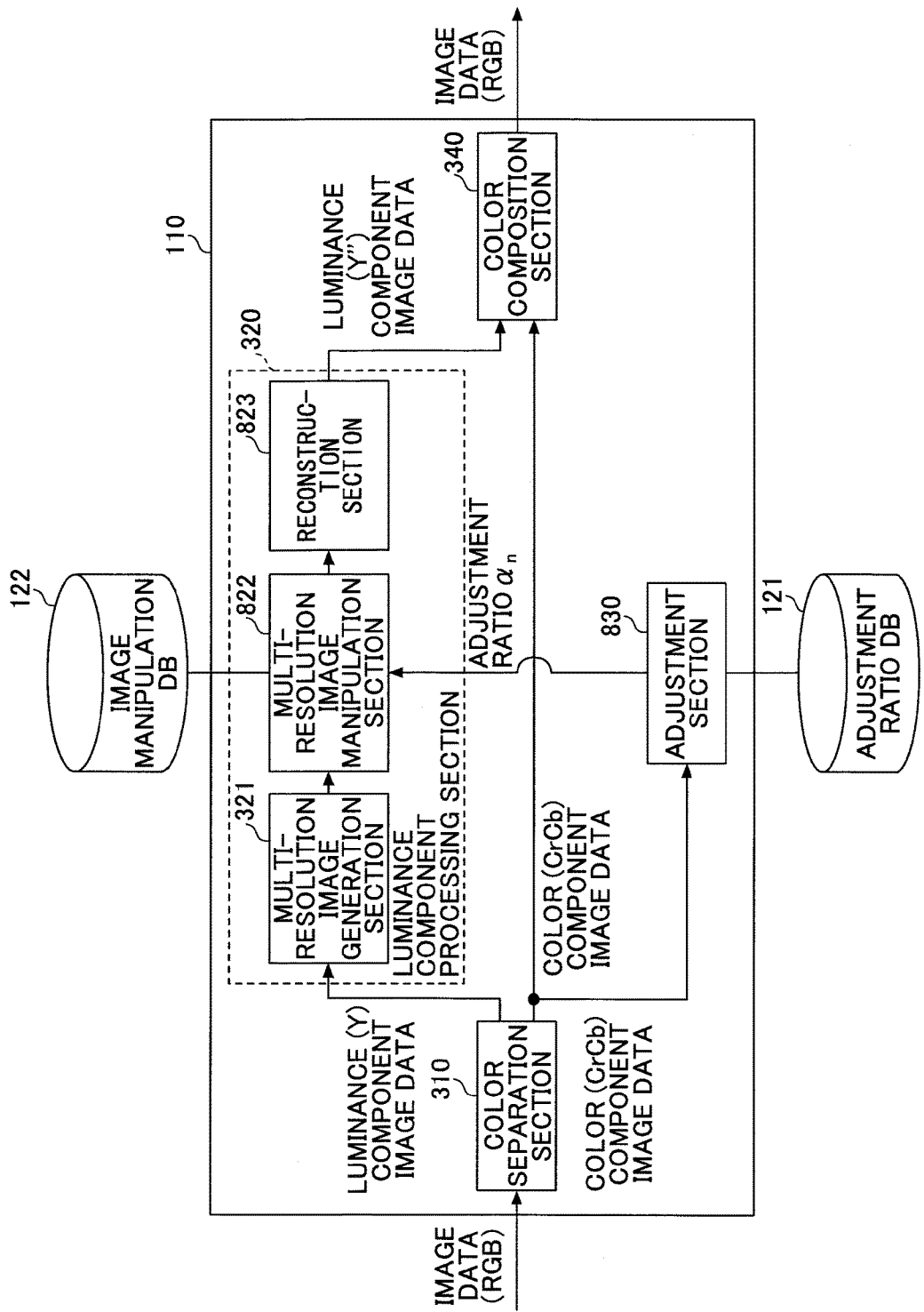

[Fig. 9]
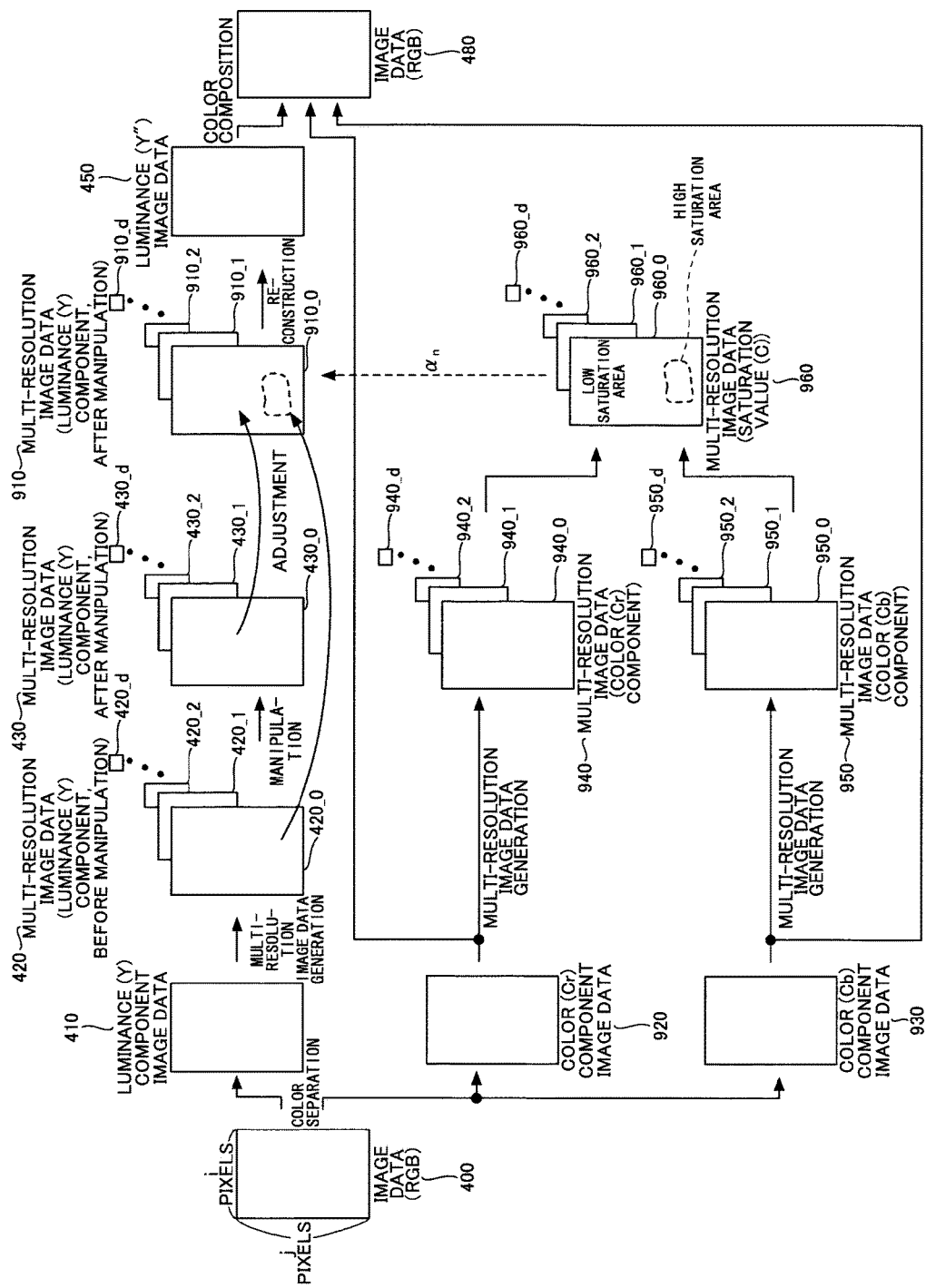

[Fig. 10]
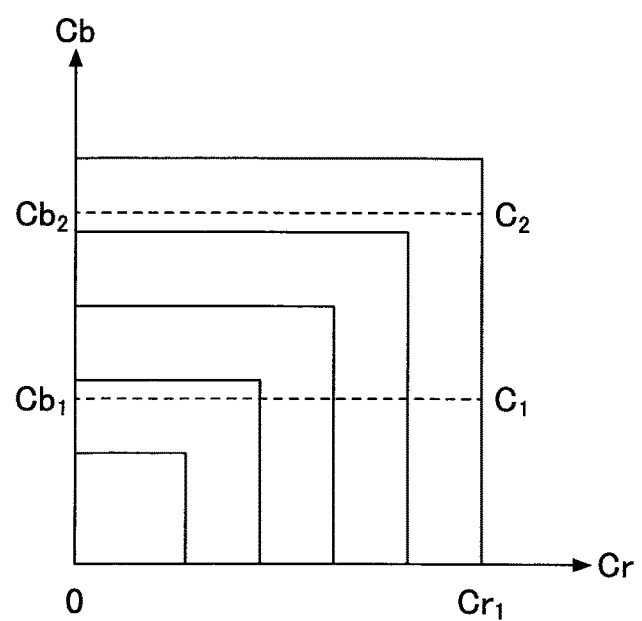

[Fig. 11]
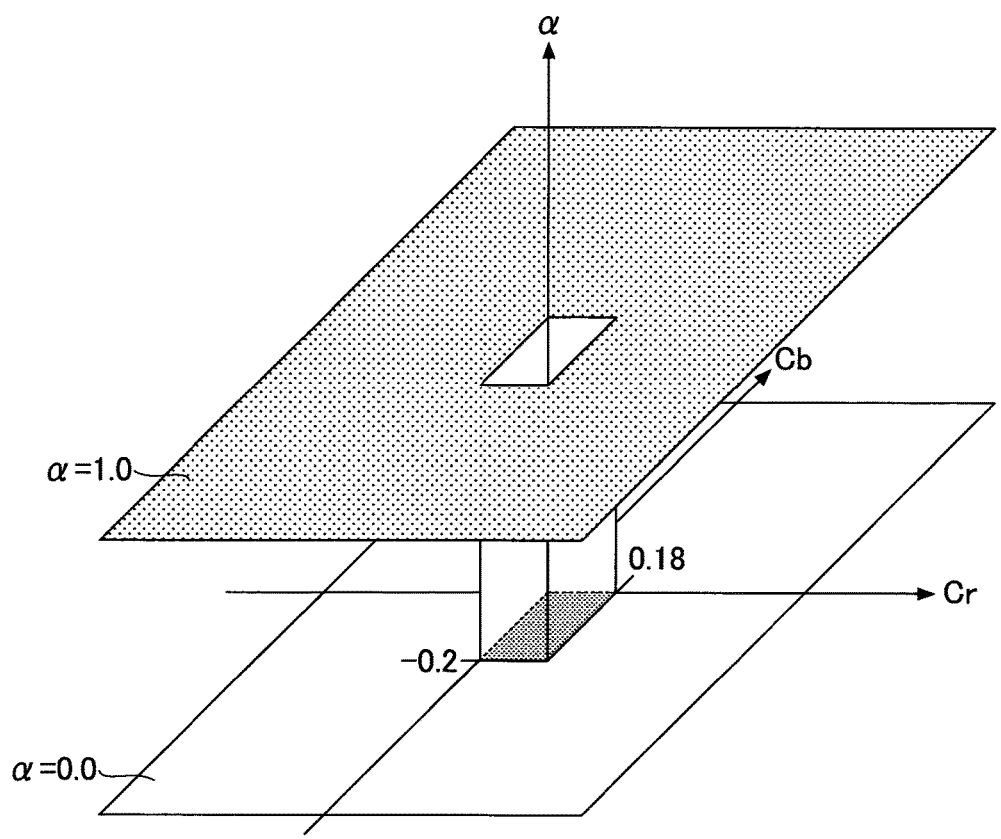

[Fig. 12]
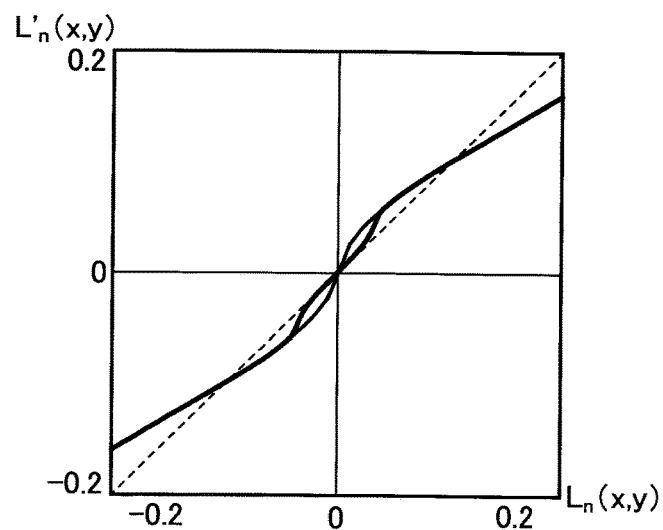
[Fig. 13]
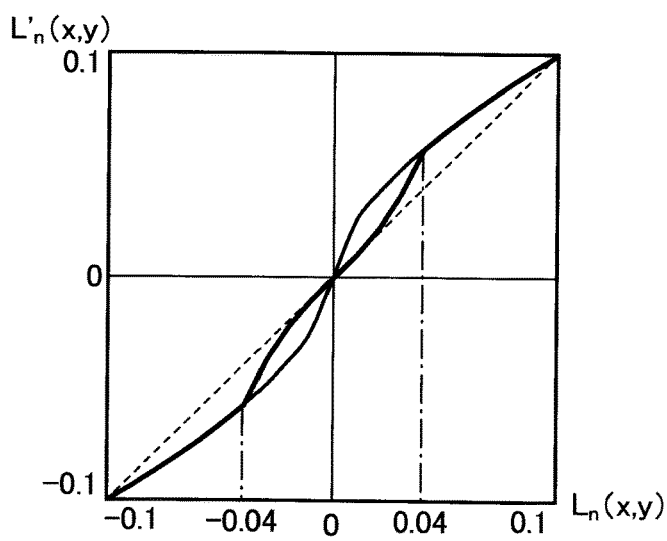

IMAGE PROCESSING APPARATUS, IMAGE PROCESSING METHOD, RECORDING MEDIUM, AND PROGRAM

TECHNICAL FIELD

The present invention relates to an image processing apparatus, an image processing method, a recording medium, and a program.

BACKGROUND ART

Conventionally, there have been various image processing methods for the image data which are captured by an imaging device such as digital camera. For example, Patent Documents 1 and 2 described below propose image processing methods in which image data are separated into a luminance component and a color component, then pixel values of multi-resolution image data, which are generated based on the luminance component image data, are manipulated and then reconstructed, and color composition is done with the color component image data.

According to such image processing methods, it is possible to improve problems of a lack of intelligibility and a lack of a sense of unevenness. Here, the image data having lacked intelligibility refers to the image data which give a hazy or foggy impression when compared with the impression recognized when a human actually sees. Further, the image data having lacked sense of unevenness refers to the image data which give a planer impression such that a sense of rampant trees or a sense of jagged rocks in an actual scene fades away.

SUMMARY OF INVENTION

Technical Problem

However, in the image processing methods like Patent Documents 1 and 2 where the pixel values of the multi-resolution image data are uniformly manipulated, an unnatural luminance change may occur in an area where a specific color component exists. Specifically, in an area where saturation is high, an uneven luminance which was not perceived before the image processing (hereinafter referred to as "pseudo contour") may newly occur by performing the image processing.

The present invention is made in light of the problem, and an object of the present invention is to improve image quality in the image processing which manipulates the pixel values of the multi-resolution image data.

Solution to Problem

According to an aspect of the present invention, an image processing apparatus includes a color separation unit separating image data into a luminance component and a color component; a processing unit generating second image data of the luminance component by manipulating pixel values of multi-resolution image data generated from first image data of the luminance component and reconstructing the manipulated multi-resolution image data; and a composition unit compositing the second image data of the luminance component with image data of the color component. Further, the processing unit generates the second image data of the luminance component based on pixel values which are adjusted by using parameters in accordance with pixel values of the image data of the color component.

Advantageous Effects of Invention

According to an aspect of the present invention, it becomes possible to improve image quality in the image processing which manipulates the pixel values of the multi-resolution image data.

BRIEF DESCRIPTION OF DRAWINGS

FIG. 1 is a drawing illustrating an entire configuration of an image processing apparatus.

FIG. 2 is a drawing illustrating a hardware configuration of the image processing apparatus.

FIG. 3 is a drawing illustrating a functional configuration of an image processing program.

FIG. 4 is a drawing illustrating an outline of image processing by the image processing program.

FIG. 5 is a drawing illustrating a calculation method of a saturation value.

FIG. 6 is a drawing illustrating a relationship between the saturation value and an adjustment ratio stored in an adjustment ratio DB.

FIG. 7 is a drawing illustrating manipulation content of pixel values of multi-resolution image data stored in an image manipulation DB.

FIG. 8 is a drawing illustrating a functional configuration of an image processing program.

FIG. 9 is a drawing illustrating an outline of image processing by the image processing program.

FIG. 10 is a drawing illustrating a calculation method of a saturation value.

FIG. 11 is a drawing illustrating a relationship between a color component and the adjustment ratio stored in the adjustment ratio DB.

FIG. 12 is a drawing illustrating the manipulation content of the pixel values of the multi-resolution image data stored in the image manipulation DB.

FIG. 13 is an enlarged view illustrating the manipulation content of the pixel values of the multi-resolution image data stored in the image manipulation DB.

DESCRIPTION OF EMBODIMENTS

In the following, embodiments of the present invention are described with reference to the accompanying drawings. Note that throughout the descriptions and the drawings of the embodiments described herein, the same reference numerals are used to describe the elements having substantially the same function as each other, and repeated descriptions thereof may be omitted.

First Embodiment

1. Entire Configuration of an Image Processing Apparatus

First, a whole configuration of an image processing apparatus is described. FIG. 1 illustrates an entire configuration of an image processing apparatus 100. As illustrated in FIG. 1, the image processing apparatus 100 includes an image processing program 110, an adjustment ratio database (hereinafter, the term "database" may be simplified as a "DB") 121, and an image manipulation DB 122.

The image processing program 110 performs processes of separating the image data, which are captured by an imaging device such as a digital camera, etc., into a luminance component and a color component thereof and manipulating the pixel values of the multi-resolution image data which are generated based on the luminance component image data. Further, the image processing program 110 reconstructs the luminance component image data based on the multi-resolution image data whose pixel values have been manipulated, and performs color composition with the color component image data.

Further, in the image processing program 110, when the luminance component image data are reconstructed, a parameter (adjustment ratio) is used which varies in accordance with the pixel value of the color component image data.

The adjustment ratio DB 121 stores the values of the adjustment ratios which are used when the image processing program 110 reconstructs the luminance component image data. Specifically, the adjustment ratio DB 121 stores the adjustment ratios, which are calculated based on the color component image data, relative to each pixel value of the image data of a saturation value.

The image manipulation DB 122 stores the information related to the manipulation amount when the image processing program 110 manipulates the pixel values of the multi-resolution image data which are generated based on the luminance component image data. Specifically, the image manipulation DB 122 stores the pixel values before the manipulation of the multi-resolution image data in association with the pixel values after the manipulation of the multi-resolution image data.

2. Hardware Configuration of Image Processing Apparatus

Next, a hardware configuration of the image processing apparatus 100 is described. FIG. 2 is a drawing illustrating a hardware configuration of the image processing apparatus 100. As illustrated in FIG. 2, the image processing apparatus 100 includes a Central Processing Unit (CPU) 201, a Read-Only Memory (ROM) 202, a Random Access Memory (RAM) 203, and an input/output section 204. Further, in the image processing apparatus 100, the CPU 201, the ROM 202, the RAM 203, and the input/output section 204 are connected to each other via a bus 205.

The CPU 201 is a computer to execute various programs (e.g., the image processing program 110) stored in the ROM 202.

The ROM 202 is a non-volatile memory. The ROM 202 stores the various programs to be executed by the CPU 201, a boot program which is necessary to execute the various programs, various DBs (e.g., adjustment ratio DB 121 and the image manipulation DB 122), etc.

The RAM 203 is a main memory such as a Dynamic Random Access Memory (DRAM), Static Random Access Memory (SRAM), etc. The RAM 203 functions as a working area which is provided when the various programs stored in the ROM 202 are executed by the CPU 201.

The input/output section 204 transmits and receives data with peripheral modules. The image data, which are to be processed by executing the image processing program 110 by the CPU 201, are input via the input/output section 204. Further, the processed image data are output via the input/output section 204.

Further, the image processing apparatus 100 is assumed to be used by being embedded into an apparatus having an imaging function or an image forming function such as an imaging apparatus like a digital camera, etc., an image forming apparatus like a scanner, etc., a smartphone, etc. Further, the image processing apparatus 100 may function as a stand-alone apparatus having an image editing function like a personal computer, a portable information terminal, etc., by connecting a user interface section. In this case, the image processing program 110 may be stored in a portable recording medium.

3. Functional Configuration of the Image Processing Program

Next, the functions are described with reference to FIGS. 3 through 7, which are realized by executing the image processing program 110 by the CPU 201. FIG. 3 is a drawing illustrating a functional configuration of the image processing program 110 according to a first embodiment. FIG. 4 is a drawing illustrating an outline of the image processing by the image processing program 110 according to the first embodiment. FIG. 5 is a drawing illustrating a method of calculating the saturation value. FIG. 6 is a drawing illustrating a relationship between the saturation value and the adjustment ratio represented in the adjustment ratio DB 121. FIG. 7 is a drawing illustrating manipulation content.

In the following, with reference to FIGS. 4 through 7 sequentially, the functional configuration of the image processing program 110 in FIG. 3 is described.

As illustrated in FIG. 3, the functions which are realized by executing the image processing program 110 by the CPU 201 include the functions realized by a color separation section 310, a luminance component processing section 320, an adjustment section 330, and a color composition section 340.

(1) Description of the Color Separation Section 310

The color separation section 310 acquires the image data which is input via the input/output section 204. The image data 400 of FIG. 4 is an example of the image data which is acquired by the color separation section 310. In the following description, it is assumed that the image data 400 has an i×j pixel size.

The file format of the image data 400 acquired by the color separation section 310 is a TIF format, and a color space thereof is an RGB color space. Further, the image data 400 acquired by the color separation section 310 has a 16-bit pixel value for each color per pixel. Note that, however, the file format of the image data 400 acquired by the color separation section 310 is not limited to the TIF format. For example, the file format thereof may be any other file format such as a JPEG format, a PNG format, etc. Further, the color space of the image data 400 acquired by the color separation section 310 is not limited to the RGB color space, and may be a color space other than the RGB color space. Further, the data amount of the pixel value per pixel in the image data 400 acquired by the color separation section 310 is not limited to 16 bits for each color.

The color separation section 310 converts the color space of the acquired image data 400 from RGB color space to YCbCr color space based on the following Formula (Formula 1).

$$Y = 0.299R + 0.587G + 0.114B$$

$$Cr = 0.500R - 0.419G - 0.081B$$

$$Cb = -0.169R + -0.2G + 0.500B \qquad [\text{Math.1}]$$

Note that, however, the color space of conversion destination by the color separation section 310 is not limited to the YCbCr color space, and may be any color space having a luminance component and a color component such as La*b* color space, HSV color space, etc.

The color separation section 310 inputs the luminance (Y) component, which is acquired by the conversion into the YCbCr color space, into the luminance component processing section 320. Further, the color separation section 310 inputs the color (CrCb) component into the adjustment section 330. The image data 410 of FIG. 4 is luminance (Y) component image data which is acquired by the conversion to the YCbCr color space, and the image data 460 of FIG. 4 is the color (CrCb) component image data which is acquired by the conversion to the YCbCr color space.

(2) Description of the Adjustment Section 330

The adjustment section 330 acquires the color (CrCb) component image data 460 which is input from the color separation section 310, and calculates the saturation value "C" based on the following Formula (2).

$$C = (Cr^2 + Cb^2)^{0.5} \quad [\text{Math.2}]$$

Here, when the color components "Cr" and "Cb" change in the horizontal axis and the vertical axis, respectively, the saturation value "C" on the same concentric circle around the origin is the same value. For example, the saturation value "$C_1$" is equal to the saturation value "$C_2$" because those values are located on the same concentric circle.

The adjustment section 330 calculates the saturation value "C" for each pixel in the color (CrCb) component image data 460. The image data 470 of FIG. 4 is the saturation value (C) image data which is calculated for each pixel by the adjustment section 330. As illustrated in FIG. 4, the saturation value (C) image data 470 includes a high saturation area and a low saturation area.

Further, the adjustment section 330 derives an adjustment ratio "α" for each pixel by referring to the adjustment ratio DB 121 based on the calculated saturation value "C". For example, the adjustment ratio DB 121 stores the following Formula (3), so that the adjustment ratio DB 121 can derive the adjustment ratio "α" based on Formula (3) when the saturation value "C" is input.

$$\begin{aligned} \alpha &= 1.0 & (C <= C_{th1}) & \quad [\text{Math. 3}] \\ &= 1.0 - 10.0 \times (C - C_{th1}) & (C_{th1} < C < C_{th2}) \\ &= 0.0 & (C_{th2} <= C) \end{aligned}$$

FIG. 6 illustrates a relationship between the saturation value "C" and the adjustment ratio "α" based on Formula (3). As is apparent from FIG. 6, according to the adjustment ratio DB 121, adjustment ratio=1 is derived relative to the pixel of low saturation and adjustment ratio=0 is derived relative to the pixel of high saturation.

Further, the method of deriving the adjustment ratio by the adjustment section 330 is not limited to the method based on Formula (3). That is the adjustment ratio may be derived based on any formula other than Formula (3). Further, the method is not limited to a case where the adjustment ratio is expressed by a formula(s). For example, the adjustment ratio may be derived based on a two-dimensional lookup table on the saturation value "C" basis.

The adjustment ratio "α" derived for each pixel by the adjustment section 330 is input to a reconstruction section 323 of the luminance component processing section 320. Here, the adjustment ratio "α" is derived for each pixel of the saturation value (C) image data 470 and thus, in the following, the adjustment ratio is described as "α(x, y)".

(3) Description of the Luminance Component Processing Section 320

Next, the luminance component processing section 320 is described. The luminance component processing section 320 includes a multi-resolution image generation section 321, a multi-resolution image manipulation section 322, and the reconstruction section 323.

(3-1) Description of the Multi-Resolution Image Generation Section 321

The multi-resolution image generation section 321 has functions to acquire the luminance (Y) component image data 410 and generate the multi-resolution image data 420.

Specifically, upon acquiring the luminance (Y) component image data 410, first, the multi-resolution image generation section 321 performs a smoothing process using a 5×5 Gaussian filter. Then, the multi-resolution image generation section 321 generates the image data, whose vertical and horizontal sizes are half of those of the luminance (Y) component image data 410 acquired by performing the smoothing process, having the pixel data belonging to rows and columns to which even numbers are allocated of the luminance (Y) component image data 410.

Further, in the following, the image data that have been generated as described above are called "scaled-down image data". Further, the header row and the header column of the luminance (Y) component image data 410 are called a "0th row" and a "0th column", respectively. (That is, the multi-resolution image generation section 321 performs processing on the rows and columns to which even numbers are allocated of the image data first.)

The image size of the scaled-down image data generated as described above is expressed as (i/2, j/2). The multi-resolution image generation section 321 repeatedly performs a scaled down processing (which is a process of generating image data whose vertical and horizontal sizes are half of those of the scaled-down image data by performing the smoothing process first and forming an image having rows and columns to which even numbers are allocated) on the scaled-down image data. As a result, the vertical and horizontal sizes of the generated image are reduced by half (½ size).

After that, the multi-resolution image generation section 321 doubles the vertical and horizontal sizes of the scaled-down image data to generate the image data having the image size (i, j) which is the same as the size of the acquired image data. In this case, the pixel values of the scaled down image data are allocated to the pixels of even-numbered rows and columns (rows and columns to which respective even numbers are allocated as the row and column numbers). Further, the pixel values of the even-numbered rows and columns are temporarily allocated to the pixels of the rows and columns at least one of which an odd number is allocated. That is, four pixels having the same pixel value are generated. After that, the smoothing process using a 5×5 Gaussian filter is performed to generate image data (hereinafter, the image data generated as described above is called "scaled-up image data").

The multi-resolution image generation section 321 generates image data in which a difference is calculated at each pixel between the image data before the scaled down processing is performed thereon and the image data which is acquired by performing the scaled down processing and then the scaled up processing. Hereinafter, the image data generated as described above is called "Laplacian component image data".

The multi-resolution image generation section 321 generates the Laplacian component image data having a first resolution level (resolution level 0). The image data 420_0 in FIG. 4 is the Laplacian component image data having the resolution level 0 and is the image data having the image size=(i, j).

Next, the multi-resolution image generation section 321 acquires a difference between the further scaled-down image data and the scaled-up image data which are generated by performing the scaled down processing and then the scaled up processing on the further scaled-down image data. By doing this, Laplacian component image data 420-1 in the next resolution level are calculated.

The Laplacian component image data 420-1 is the Laplacian component image data having a resolution level 1 and is the image data having the image size=(i/2, j/2).

After that, the multi-resolution image generation section 321 repeats the scaled down processing, the scaled up processing, and the process of calculating the Laplacian component image data until the Laplacian component image data 420_d having the image size=(2, 2) are calculated. By doing this, it becomes possible to generate a set of Laplacian component image data from the Laplacian component image data 420_0 having the image size=(i, j) and having the resolution level 0 to the Laplacian component image data 420_d having the image size=(2, 2) and having the resolution level d. The set of the Laplacian component image data corresponds to a set of image data of the multi-resolution image data 420 having respective resolution levels which is a so-called "Laplacian pyramid".

In the above description, the 5×5 Gaussian filter is used as a smoothing filter when the multi-resolution image generation section 321 performs the scaled down processing and the scaled up processing. Note that, however, any other smoothing filter may be alternatively used. Further, without using any smoothing filter, a so-called "interpolation process" may be used when the scaled down processing and the scaled up processing are performed. As specific examples of the interpolation process, there are a bi-linear method, a bi-cubic method, etc.

Further, when the scaled down processing is repeatedly performed, there may be a case where the image size corresponds to an odd number depending on the luminance (Y) component image data 410. In such a case, according to this embodiment, it is assumed that the multi-resolution image generation section 321 performs the scaled down processing by using the rows and columns to which even numbers are allocated. However, when the image size corresponds to an odd number, the method of the scaled down processing is not limited thereto.

For example, when the image size (e.g., the number of rows is P) corresponds to an odd number, the scaled down processing may be performed by assuming that the image size (number of rows) after the scaled down process is (P+1)/2. In this case, the pixel values at the pixels where both row and column have respective even numbers before the scaled down processing is performed are reflected on the pixels after the scaled down process is performed.

Otherwise, when the image size (the number of rows) before the scaled down processing corresponds to an odd number, one row may be added first and then the scaled down processing is performed to generate the image data having a half (½) size. Further, at the stage when the luminance (Y) component image data 410 is acquired, the image size may be expanded by 2-factorial first and the multi-resolution image data 420 is generated.

(3-2) Description of the Multi-Resolution Image Manipulation Section 322

The multi-resolution image manipulation section 322 is described. The multi-resolution image manipulation section 322 manipulates the pixel values of the Laplacian component image data 420_n having the resolution level n included in the multi-resolution image data 420 generated by the multi-resolution image generation section 321 based on the following Formula (4)

$$L'_n(x, y) = sign * (|L_n(x, y)|/\text{range})^\alpha * \text{range} \quad (\text{When } |L_n(x, y)| < \text{range})$$
$$= sign * (grad * (|L_n(x, y)| - \text{range}) + \text{range}) \quad (\text{When range} < |L_n(x, y)|)$$

Here, the elements in Formula (4) denote as follows.

The element "L'n(x, y)" denotes the corresponding pixel values of the Laplacian component image data after manipulation at the resolution level n, where "n" is in a range from 0 to d (upper limit determined depending on input image size).

The element "|Ln(x, y)|" denotes an absolute value (magnitude) of the pixel values in the Laplacian component image data before manipulation at the resolution level n.

The element "sign" has a value "1" or "−1" when the value of Ln(x, y) is positive or negative, respectively.

Here, the element "range" is set to "0.1". This is because the luminance (Y) component image data in YCbCr color space corresponds to the original image and the luminance (Y) component image data is in a range from 0.0 to 1.0. Further, the value of the "range" depends on the dynamic range of the original image.

Here, the element "α" is set to 0.6.

Further, the element "grad" is set to 0.6. (Further, the value of "grad" depends on the dynamic range of the original image.)

FIG. 7 is a graph of the manipulation content of FIG. 4 illustrating a relationship between the Laplacian component image data before manipulation and the Laplacian component image data after the manipulation calculated by using Formula 4. In FIG. 7, the bold solid line expresses the relationship of Formula 4. As a comparison, the dotted line in the graph expresses that the relationship of the inclination is 1 (i.e., the pixel values of the Laplacian component image data do not change between before and after the manipulation).

As is apparent from FIG. 7, with respect to the pixel value having a small absolute value (pixel value having a small absolute value of the Laplacian component image data before manipulation), the manipulation is performed in a manner such that the pixel value is increased and the increase amount thereof is relatively large. On the other hand, with respect to the pixel value having a large absolute value (pixel value having a large absolute value of the Laplacian component image data before manipulation), the manipulation is performed in a manner such that the pixel value is increased but the increase amount thereof is relatively small or the pixel value is decreased.

Further, note that the content of the manipulation by the multi-resolution image manipulation section 322 is not limited to the content of the manipulation illustrated in FIG. 4, and any other content of the manipulation may be performed. Further, the manipulation performed by the multi-resolution image manipulation section 322 is not limited to that performed based on a formula such as Formula (4), and the manipulation may be performed based on, for example, a lookup table.

Further, in Formula (4), it is set that "range=0.1" because it is assumed that the multi-resolution image data 420 of the luminance (Y) component image data 410 in YCbCr space is manipulated. In the case of the multi-resolution image data 420 of the luminance (Y) component image data 410 in YCbCr space, the dynamic range (Dr) is in a range from 0.0 to 1.0. Therefore, it is set that range=0.1.

In other words, in a case of the multi-resolution image data which are based on another color space having different dynamic range, the value of the "range" changes accordingly. For example, in the case of the multi-resolution image data which are based on La*b* color space, the dynamic range is from 0.0 to 100.0. Therefore, it is to be set that range=10.

That is, the content of the manipulation by the multi-resolution image manipulation section 322 varies depending on whether the value of the Laplacian component image data 420_$n$ before the manipulation at the resolution level n satisfies the following Formula (5).

$$L_n/Dr<0.1 \qquad [\text{Math.5}]$$

Based on this, the pixel value Ln where the dynamic range (Dr) is less than $\frac{1}{10}$ increases, and the pixel value Ln where the dynamic range (Dr) is greater than or equal to $\frac{1}{10}$ decreases.

(3-3) Description of the Reconstruction Section 323

The reconstruction section 323 reconstructs luminance (Y) component image data based on multi-resolution image data 430, which is after manipulation, by repeatedly performing manipulation which is opposite to the manipulation of the multi-resolution image generation section 321. Specifically, the calculation starts with the resolution level on the lower resolution side, and the process of adding the pixel values generated after the scaled up processing is repeated in each of the resolution levels, so that luminance (Y') component image data is reconstructed. In FIG. 4, the image data 440 is the reconstructed luminance (Y') component image data.

Further, the calculation of the scaled up processing in the reconstruction section 323 is based on the method same as that in the calculation of the scaled up processing in the multi-resolution image generation section 321. That is, the image data are generated whose image size is the same as that before the scaled down processing (basically, the image size having doubled in both vertical and horizontal directions), and the pixel values of the multi-resolution image data of a low resolution level are set to the pixels at the row and column to which respective even numbers are allocated. In this case, the pixel values of the even-numbered rows and columns are temporarily allocated to the pixels of the rows and columns at least one of which an odd number is allocated (that is, four pixels having the same pixel value are generated). After that, the smoothing process using a 5×5 Gaussian filter is performed to generate the scaled-up image data.

Further, the reconstruction section 323 composites between the luminance (Y') component image data 440 acquired by the reconstruction and the luminance (Y) component image data 410 before manipulation by using the adjustment ratio α(x, y) which is input from the adjustment section 330.

Specifically, the pixel values (Y" (x, y)) of luminance (Y") component image data 450 are calculated based on the following Formula (6) by using the adjustment ratio α(x, y) input from the adjustment section 330.

$$Y''(x,y)=\alpha(x,y)*Y'(x,y)+(1-\alpha(x,y))*Y(x,y) \qquad [\text{Math.6}]$$

Due to the reflection of the adjustment ratio α(x, y) in Formula (6), the luminance (Y") component image data 450 becomes so that:

i) pixels values in an area corresponding to the low saturation area of the saturation value (C) image data 470 become the pixel values on which the manipulation relative to the multi-resolution image data is reflected. That is, the pixel values become similar to the pixel values of the luminance (Y') component image data 440; and ii) pixels values in an area corresponding to the high saturation area of the saturation value (C) image data 470 become the pixel values on which the manipulation relative to the multi-resolution image data is not reflected. That is, the pixel values become similar to the pixel values of the luminance (Y) component image data 410.

As a result, it becomes possible to prevent the occurrence of pseudo contour in the high saturation area caused by performing the manipulation on the multi-resolution image data.

The reconstruction section 323 outputs the luminance (Y") component image data 450 calculated as described above to the color composition section 340.

(4) Description of the Color Composition Section 340

The color composition section 340 performs color composition between the luminance (Y") component image data 450 output from the reconstruction section 323 and the color (CrCb) component image data 460 output from the color separation section 310. Further, the color composition section 340 performs conversion from the YCrCb color space to the RGB color space on the image data acquired by the color composition, and outputs the image data 480 having RGB color components.

4. Outline

As is apparent from the above descriptions, in the image processing of manipulating the pixel values of the multi-resolution image data in the image processing apparatus according to this embodiment, i) different adjustment ratios are derived based on the color component image data between the pixels having higher saturation and the pixels having lower saturation; and ii) composition is performed between the luminance component image data before manipulation and the luminance component image data, which is acquired by restructuring the multi-resolution image data after manipulation, by using the derived adjustment ratios.

By doing this, on the luminance component image data to be composited with the color component image data, i) in the high saturation area, the luminance component image data before manipulation is reflected; and ii) in the low saturation area, the luminance component image data after manipulation is reflected.

As a result, it becomes possible to prevent the occurrence of pseudo contour in the high saturation area caused by performing the manipulation on the multi-resolution image data. That is, it becomes possible to improve the image quality in the image processing of manipulating the pixel values of the multi-resolution image data.

Second Embodiment

In the first embodiment, the composition is made between the luminance (Y) component image data, which is acquired by performing the color separation on the input image data, and the luminance (Y") component image data, which is acquired by restructuring the multi-resolution image data after manipulation, by using the derived adjustment ratios.

On the other hand, in a second embodiment, the composition is made between the multi-resolution image data before manipulation and the multi-resolution image data after manipulation by using the derived adjustment ratios. By doing this, in the high saturation area, it becomes possible to generate the multi-resolution image data on which the multi-resolution image data after manipulation have not been reflected. Further, in the low saturation area, it becomes possible to generate the multi-resolution image data on which the multi-resolution image data after manipulation have been reflected. In the following, details of the second embodiment are described. Note that the points different from those in the first embodiment are mainly described.

1. Functional Configuration of an Image Processing Apparatus

With reference to FIGS. 8 and 9, the functions are described realized by executing an image processing program 110 according to the second embodiment by the CPU 201. FIG. 8 is a drawing illustrating a functional configuration of the image processing program 110 according to the second embodiment. FIG. 9 is a drawing illustrating an outline of the image processing by the image processing program 110 according to the second embodiment. In the following, the functional configuration of the image processing program 110 of FIG. 8 is described with reference to FIG. 9 occasionally. Here, the functional configuration of FIG. 8 differs from that described with reference to FIG. 3 in the first embodiment in an adjustment section 830, a multi-resolution image manipulation section 822, and a reconstruction section 823. Therefore, in the following, the adjustment section 830, the multi-resolution image manipulation section 822, and the reconstruction section 823 are described in detail.

(1) Description of the Adjustment Section 830

The adjustment section 830 acquires the color (Cr) component image data and the color (Cb) component image data from the color separation section 310. The image data 920 of FIG. 9 is the color (Cr) component image data and the image data 930 of FIG. 9 is the color (Cb) component image data.

The adjustment section 830 generates respective multi-resolution image data relative to the color (Cr) component image data and the color (Cb) component image data. Specifically, the adjustment section 830 generates the multi-resolution image data by repeatedly performing only the scaled down process on the color (Cr) component image data and the color (Cb) component image data.

The image data 940 of FIG. 9 are the multi-resolution image data generated based on color (Cr) component image data 920. The image data 950 of FIG. 9 are the multi-resolution image data generated based on color (Cb) component image data 930.

Further, the processing to generate the multi-resolution image data 940 relative to the color (Cr) component image data 920 is similar to the process to generate the multi-resolution image data 950 relative to the color (Cb) component image data 930. Due to this, in the following, the processing to generate the multi-resolution image data 940 relative to the color (Cr) component image data 920 is described.

The adjustment section 830 performs a smoothing process on the color (Cr) component image data 920 (image data having the image size=(i, j)) using a 5×5 Gaussian filter.

Next, the adjustment section 830 generates the image data, whose vertical and horizontal sizes are half of those of the color (Cr) component image data 920, having (only) the rows and columns to which corresponding even numbers are allocated in the image data on which the smooth process has been performed. Further, similar to the first embodiment, the header row and the header column are called the "0th row" and the "0th column", respectively. That is, similar to the first embodiment, the scaled down processing is performed on the rows and columns, to which even numbers are allocated, of the color (Cr) component image data 920.

By the above processing, the Gaussian component image data 940_1 having the first resolution level of a Gaussian pyramid (resolution level 1) is generated. Further, the Gaussian component image data 940_0 having a resolution level 0 is the same as the color (Cr) component image data 920 output from the color separation section 310.

After that, the scaled down processing is repeatedly performed, the Gaussian component image data having respective resolution levels are generated until the image size is (2, 2). The pixel values of the Gaussian component image data 940_n having a resolution level n of the color component (Cr) generated as described above are expressed as Crn(x, y).

Similarly, the adjustment section 830 generates the Gaussian pyramid of the multi-resolution image data 950 relative to the color (Cb) component image data 930. Here, the generated pixel values of the Gaussian component image data 950_n having a resolution level n of the color component (Cb) are expressed as Cbn(x, y).

The adjustment section 830 generates saturation value (C) multi-resolution image data by using the multi-resolution image data 940 and the multi-resolution image data 950 generated as described above. Specifically, the adjustment section 830 generates saturation value (C) multi-resolution image data by using the Gaussian component image data 940_n having the resolution level n relative to the color (Cr) component image data 920 and the Gaussian component image data 950_n having the resolution level n relative to the color (Cb) component image data 930.

In FIG. 9, the image data 960 are the saturation value (C) multi-resolution image data calculated by the adjustment section 830 for each resolution level. Further, the pixel values Cn(x, y) of the saturation value (C) multi-resolution image data 960 are calculated based on the following Formula (7).

$$C_n(x,y) = (Cr_n(x,y)^2 + Cb_n(x,y)^2)^{0.5} \quad [\text{Math.7}]$$

Based on the pixel values Cn(x, y) of the saturation value (C) multi-resolution image data 960 generated as described above, the adjustment section 830 calculates the adjustment ratios based on the following Formula (8).

$$\begin{aligned}\alpha_n(x, y) &= 1.0 & (C_n <= C_{th1}) \\ &= 1.0 - 10.0 \times (C_n(x, y) - C_{th1}) & (C_{th1} < C_n < C_{th2}) \\ &= 0.0 & (C_{th2} <= C_n)\end{aligned}$$

In Formula (8), the "αn(x, y)" denotes the adjustment ratio to be used when the composition is made between the pixel values of the luminance (Y) component multi-resolution image data having the solution level n before and after manipulation.

The adjustment section 830 inputs the adjustment ratios αn(x, y) corresponding to the pixel values Cn(x, y) of the saturation value (C) multi-resolution image data 960 having the resolution level n in the multi-resolution image manipulation section 822. Here, the relationship between the pixel values Cn(x, y) of the saturation value (C) multi-resolution image data 960 having the resolution level n and the adjustment ratios αn(x, y) is already described in the above first embodiment with reference to FIG. 6, therefore, the repeated description thereof is herein omitted.

(2) Description of the Multi-Resolution Image Manipulation Section 822

From the multi-resolution image generation section 321, the multi-resolution image manipulation section 822 acquires the pixel values Ln(x, y) of the Laplacian component image data 420_n having the resolution level n included in the multi-resolution image data 420 relative to the luminance (Y) component image data 410. Then, the multi-resolution image manipulation section 822 manipulates the acquired pixel values Ln(x, y) of the Laplacian component image data 420_n based on Formula (4). By doing this, the pixel values L'n(x, y) of the Laplacian component image data 430_n after manipulation are obtained.

The multi-resolution image manipulation section 822 makes composition between the pixel values L'n(x, y) of the Laplacian component image data 430_n after manipulation and the pixel values Ln(x, y) of the Laplacian component image data 420_n before manipulation. During the composition, the adjustment ratios αn(x, y) output from the adjustment section 830 are used.

Specifically, based on the following Formula (9), the multi-resolution image manipulation section 822 calculates the pixel values L"n(x, y) of the Laplacian component image data 910_n having the resolution level n after composition.

$$L_n''(x,y)=\alpha_n(x,y)*L_n'(x,y)+(1.0-\alpha_n(x,y))*L_n(x,y) \quad [\text{Math.9}]$$

By Formula (9), the adjustment ratios αn(x, y) are reflected, so that in luminance (Y) component multi-resolution image data 910 after composition, i) the pixel values in the area corresponding to the low saturation area of the saturation value (C) multi-resolution image data 960 are the pixel values on which the manipulation relative to the luminance (Y) component multi-resolution image data is reflected, that is, the pixel values in the area corresponding to the low saturation area are the pixel values of the multi-resolution image data after manipulation; and ii) the pixel values in the area corresponding to the high saturation area of the saturation value (C) multi-resolution image data 960 are the pixel values on which the manipulation relative to the luminance (Y) component multi-resolution image data is not reflected, that is, the pixel values in the area corresponding to the high saturation area are the pixel values of the multi-resolution image data before manipulation.

As a result, it becomes possible to prevent the occurrence of pseudo contour in the high saturation area caused by performing the manipulation on the multi-resolution image data.

(3) Description of the Reconstruction Section 823

The reconstruction section 823 reconstructs the luminance (Y") component image data 450 by repeatedly performing the manipulation, which is opposite to the manipulation of the multi-resolution image generation section 321, on the luminance (Y) component multi-resolution image data 910 which is output from the multi-resolution image manipulation section 822.

The luminance (Y") component image data 450 acquired by restructuring the luminance (Y) component multi-resolution image data 910 in the reconstruction section 823 is input in the color composition section 340, so that the luminance (Y") component image data 450 is composited with the color (Cr) component image data 920 and the color (Cb) component image data 930.

2. Outline

As is apparent from the above description, in the image processing apparatus according to this embodiment, in the image processing of manipulating the pixel values of the multi-resolution image data, i) multi-resolution image data relative to color component image data are generated and the saturation values at each of the resolution levels are calculated, so that different adjustment ratios are derived between the pixels having high saturation and the pixels having low saturation; and ii) in restructuring the multi-resolution image data generated from the luminance component image data, the composition is made using the multi-resolution image data after manipulation and the multi-resolution image data before manipulation by using the adjustment ratios.

By doing this, in the reconstructed luminance component multi-resolution image data, i) on the high saturation area, the luminance component multi-resolution image data before manipulation is reflected; and ii) on the low saturation area, the luminance component multi-resolution image data after manipulation is reflected.

As a result, it becomes possible to prevent the occurrence of pseudo contour in the high saturation area caused by performing the manipulation on the multi-resolution image data. That is, it becomes possible to improve the image quality in the image processing of manipulating the pixel values of the multi-resolution image data.

Third Embodiment

In the above first and second embodiments, in calculating the saturation value (C) image data by using the color (Cr) component image data and the color (Cb) component image data, a square-root of sum of squares of the pixel values of the color (Cr) component image data and the color (Cb) component image data are used. On the other hand, in a third embodiment, the pixel values of the color (Cr) component image data or the pixel values of the color (Cb) component image data, whichever is greater, are set as the saturation values (C). That is, in the third embodiment, the adjustment sections 330 and 830 calculate the saturation values (C) based on the following Formula (10).

$$C=\max(|C_r|,|C_b|) \quad [\text{Math.10}]$$

Further, as illustrated in FIG. 10, the saturation values (C) calculated based on the following Formula (10) are arranged on the sides of similar quadrates having a common corner at the origin of the coordinates where the color (Cr) component is plotted along the horizontal axis and the color (Cb) is plotted along the vertical axis. For example, the saturation value $C_1$ is equal to the saturation value $C_2$.

In the adjustment sections 330 and 830, by calculating the saturation values (C) based on Formula (10), it becomes possible to reduce the processing load in calculating the saturation values (C).

Fourth Embodiment

In the above first through third embodiments, the adjustment ratio "α" is set to one when the saturation value (C) is less than or equal to the threshold value $C_{th1}$ and adjustment ratio "α" is set to zero when the saturation value (C) is greater than or equal to the threshold value $C_{th2}$, so that the manipulation relative to the multi-resolution image data is not reflected on the high saturation area.

On the other hand, in a fourth embodiment, when the color (Cr, Cb) components are within a predetermined range, the adjustment ratio "α" is set to zero, and otherwise, the adjustment ratio "α" is set to one. By doing this, it becomes possible not to reflect the manipulation relative to the multi-resolution image data on the area having predetermined color (Cr, Cb) components. Specifically, the following Formula (11) is stored in the adjustment ratio DB 121, so that when the color (Cr, Cb) components are input, the adjustment ratio "α" is derived based on the following Formula (11).

$$\alpha = 0.0 \quad 0.02 <= Cr <= 0.18 \text{ and } -0.2 <= Cb <= 0.0 \quad \text{[Math. 11]}$$
$$= 1.0 \quad \text{When other than above}$$

Further, FIG. 11 illustrates a relationship between the color (Cr, Cb) components of Formula (11) and the adjustment ratio "α". As apparent from FIG. 11, according to the adjustment ratio DB 121, adjustment ratio=0 is derived relative to the pixels having the color (Cr, Cb) components within a predetermined range, and adjustment ratio=1 is derived relative to the pixels having the color (Cr, Cb) components outside the predetermined range.

For example, the range of the color (Cr) component and the color (Cb) component is a range corresponding to colors of human skin. In this case, when the adjustment ratio "α" is used derived based on Formula (11), the manipulation relative to the luminance (Y) component multi-resolution image data is not reflected on the area including the colors of human skin.

Generally, when the manipulation relative to luminance (Y) component multi-resolution image data is performed, a small density change is increased. As a result, effects of improved sense of intelligibility and sense of unevenness can be acquired. On the other hand, creases and pores of human skin may be emphasized. In the fourth embodiment, by using the adjustment ratio "α" derived based on Formula (11), it becomes possible to prevent the increase of a small density change with respect to human skin. That is, in the image processing of manipulating the pixel values of the multi-resolution image data, it becomes possible to both improve a sense of intelligibility and a sense of unevenness and prevent the degradation of human skin.

Fifth Embodiment

In the above first through fourth embodiments, a case is described where the multi-resolution image data generated by the multi-resolution image generation section 321 is a Laplacian pyramid. On the other hand, in a fifth embodiment, a case is described where the multi-resolution image generation section 321 generates the multi-resolution image data by repeatedly performing two-dimensional discrete wavelet transformation.

The two-dimensional discrete wavelet transformation is a known technique. Thus, a detailed description thereof is herein omitted. When the two-dimensional discrete wavelet transformation is performed, by a one-time transformation process, the luminance (Y) component image data are decomposed into one low-frequency coefficient "LL" and three high-frequency coefficients "LH", "HL", and "HH". The multi-resolution image generation section 321 further performs the two-dimensional discrete wavelet transformation repeatedly on the low-frequency coefficient "LL", one low-frequency coefficient "LL" and three high-frequency coefficients "LH", "HL", and "HH" in the next resolution level are calculated.

The multi-resolution image manipulation section 322 applies the manipulation of Formula (4) on the coefficients "LH", "HL", and "HH" in each of the resolution levels calculated as described. Then, the reconstruction section 323 reconstructs the multi-resolution image data and generates the luminance (Y") component image data 450.

As described above, by using the two-dimensional discrete wavelet transformation in generating the multi-resolution image data, it becomes possible to enjoy a benefit of reducing a memory area to store the multi-resolution image data.

Sixth Embodiment

In the above first through fifth embodiments, the luminance (Y) component multi-resolution image data are manipulated based on the manipulation content of FIG. 7. Specifically, i) the pixel values having small absolute values (pixel values having small absolute values of the Laplacian component image data) are manipulated so that the pixel values are increased and the increase amounts are relatively large; and ii) the pixel values having large absolute values (pixel values having large absolute values of the Laplacian component image data) are manipulated so that the pixel values are increased and the increase amounts are relatively small, or the pixel values are decreased.

On the other hand, in a sixth embodiment, the manipulation is performed in a manner such that a set of pixel values, which are relatively small among the pixel values whose absolute values are small, are not changed; and the pixel values, which are not included in the set of pixel values and which are included in the pixel values whose absolute values are small, are increased.

FIG. 12 is a drawing illustrating the content of the manipulation relative to the multi-resolution image data by the multi-resolution image manipulation section 322 and 822 according to the sixth embodiment. Further, FIG. 13 is an enlarged view of an area in the vicinity of the origin of FIG. 12.

As illustrated in FIG. 13, in the multi-resolution image manipulation section 322 and 822 according to the sixth embodiment, the manipulation amounts are reduced when the absolute value of the pixel values of the Laplacian component image data is less than or equal to 0.04. This is because when there is a noise component in the luminance (Y) component image data, such a noise component is more likely to be expressed as a small slope. When a small slope is considered in view of the Laplacian component, the small slope corresponds to a small Laplacian component. Therefore, it becomes possible to prevent the noise component from being emphasized by reducing the manipulation amount when the absolute value of the Laplacian component image data is less than or equal to 0.04.

On the other hand, in the luminance (Y) component image data, the pixels to be emphasized are the pixels whose values are slightly greater than those of a noise component in the Laplacian component image data included in the luminance (Y) component multi-resolution image data. Thus, in this embodiment, it is intended to improve a sense of intelligibility and a sense of unevenness by increasing the manipulation amounts relative to the pixels whose absolute values in the Laplacian component image are slightly greater than 0.04.

Seventh Embodiment

In the sixth embodiment, it is assumed that the multi-resolution image manipulation section 822 applies the content of the manipulation of FIG. 12 or 13 to all the resolution levels. On the other hand, in a seventh embodiment, the multi-resolution image manipulation section 822 applies the content of the manipulation of FIG. 12 or 13 to the multi-resolution image data having high resolution levels and multi-resolution image data having low resolution levels.

By doing this, the manipulation content, in which the manipulation amounts are reduced relative to the pixels whose absolute values of the Laplacian component image data are small, is applied to the multi-resolution image data having high resolution levels and multi-resolution image data having low resolution levels. On the other hand, the manipulation content, in which the manipulation amounts are not reduced relative to the pixels whose absolute values of the Laplacian component image data are small, is applied to the multi-resolution image data having middle resolution levels.

Here, the "high", the "middle", and the "low" resolutions levels are described. For example, when it is assumed that the size of the luminance (Y) component image data to be input is 4928×3280 pixels, the resolution levels generated by the multi-resolution image generation section 321 and 822 are resolution levels 0 through 12.

In this case, for example, the resolution levels 0 through 2 are classified as the high resolution levels, so that the multi-resolution image manipulation sections 322 and 822 apply the manipulation content of FIG. 12 or 13.

Further, the resolution levels 3 through 7 are classified as the middle resolution levels, so that the multi-resolution image manipulation sections 322 and 822 apply the manipulation content of FIG. 7. Further, the resolution levels 8 through 12 are classified as the low resolution levels, so that the multi-resolution image manipulation sections 322 and 822 apply the manipulation content of FIG. 12 or 13.

Further, the reasons why the manipulation content varies depending on the resolution levels are described below. That is, a noise component included in the luminance (Y) component image data is more likely to be included in the Laplacian component image data having high resolution levels when the multi-resolution image data are generated. On the other hand, in the Laplacian component image data having middle resolution levels, actually existing contrast is included even in a very small slope.

Further, in the Laplacian component image data having low resolution levels, density levels (pseudo contour) are more likely to be noticed by emphasizing a very small slope. Due to this, the manipulation content of FIG. 12 or 13, in which the manipulation amounts are reduced, is applied to the pixels whose absolute values of the Laplacian component image data are small.

As a result, according to the seventh embodiment, it becomes possible to emphasize a signal component (contrast actually existing in an object to be imaged) in the luminance (Y) component image data without reducing the signal component more than necessary while preventing the emphasis of a noise component and the occurrence of the density levels (pseudo contour). That is, in the image processing of manipulating the pixel values of the multi-resolution image data, it becomes possible to intend to improve image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application No. 2014-170387 filed Aug. 25, 2014, the entire contents of which are hereby incorporated herein by reference.

REFERENCE SIGNS LIST

100 image processing apparatus
110 image processing program
121 adjustment ratio DB
122 image manipulation DB
320 luminance component processing section
321 multi-resolution image generation section
322 multi-resolution image manipulation section
323 reconstruction section
330 adjustment section
340 color composition section
822 multi-resolution image manipulation section
823 reconstruction section
830 adjustment section

CITATION LIST

Patent Literature

[PTL 1] Japanese Laid-open Patent Publication No. 2007-142670
[PTL 2] Japanese Laid-open Patent Publication No. 2014-068330

The invention claimed is:

1. An image processing apparatus comprising:
a memory; and
a processor that is coupled to the memory and that is configured to
separate image data into a luminance component and a color component;
generate second image data of the luminance component by manipulating pixel values of multi-resolution image data generated from first image data of the luminance component and reconstructing the manipulated multi-resolution image data; and
composite the second image data of the luminance component with image data of the color component,
wherein the processor is configured to generate the second image data of the luminance component based on pixel values which are adjusted by using parameters in accordance with pixel values of the image data of the color component, and
wherein the processor is configured to generate the second image data of the luminance component by compositing the first image data of the luminance component with third image data of the luminance component, which is generated by the reconstructing, by using the parameters in accordance with the pixel values of the image data of the color component.

2. The image processing apparatus according to claim 1, wherein the processor is configured to generate the second image data of the luminance component by reconstructing a composition between the multi-resolution image data, which is generated from the first image data of the luminance component, and the manipulated multi-resolution image data, in which the pixel values of the multi-resolution image data are manipulated, by using the parameters in accordance with the pixel values of the image data of the color component.

3. The image processing apparatus according to claim 1, wherein the parameters indicate ratios when the first image data of the luminance component and the third image data of the luminance component are composited with each other, and wherein the greater the pixel values of the image data of the color component, the greater the ratios of the first image data of the luminance component when the first image data of the luminance component and the third image data of the luminance component are composited with each other.

4. The image processing apparatus according to claim 2, wherein the parameters indicate ratios when the multi-resolution image data, which are generated from the first image data of the luminance component, and the manipulated multi-resolution image data, in which the pixel values of the multi-resolution image data are manipulated, are composited with each other and wherein the greater the pixel values of the image data of the color component, the greater the ratios of the multi-resolution image data generated from the first image data of the luminance component when the multi-resolution image data, which are generated from the first image data of the luminance component, and the manipulated multi-resolution image data, in which the pixel values of the multi-resolution image data are manipulated are composited with each other.

5. The image processing apparatus according to claim 4, wherein the parameters are determined for each of resolution levels of multi-resolution image data which are generated from the image data of the color component.

6. The image processing apparatus according to claim 1, wherein the parameters are set to one or zero when pixel values of image data of saturation values calculated based on the image data of the color component are less than or equal to a predetermined value $C_{th1}$ or greater than or equal to a predetermined value $C_{th2}$ ($C_{th1} < C_{th2}$).

7. The image processing apparatus according to claim 1, wherein the processor is configured to generate the multi-resolution image data of a Laplacian pyramid from the first image data of the luminance component.

8. The image processing apparatus according to claim 1, wherein the processor is configured to generate the multi-resolution image data by performing a discrete wavelet transformation on the first image data of the luminance component.

9. The image processing apparatus according to claim 1, wherein the processor is configured to manipulate to increase pixel values which are less than one tenth of a dynamic range of the first image data of the luminance component and which are included in the pixel values of the multi-resolution image data generated from the first image data of the luminance component.

10. An image processing method comprising:
separating image data into a luminance component and a color component;
generating second image data of the luminance component by manipulating pixel values of multi-resolution image data generated from first image data of the luminance component and reconstructing the manipulated multi-resolution image data; and
compositing the second image data of the luminance component with image data of the color component,
wherein the second image data of the luminance component are generated based on pixel values which are adjusted by using parameters in accordance with pixel values of the image data of the color component, and
wherein the second image data of the luminance component are generated by compositing the first image data of the luminance component with third image data of the luminance component, which is generated by the reconstructing, by using the parameters in accordance with the pixel values of the image data of the color component.

11. A non transitory recording medium storing a program causing a computer to execute an image processing method comprising:
separating image data into a luminance component and a color component;
generating second image data of the luminance component by manipulating pixel values of multi-resolution image data generated from first image data of the luminance component and reconstructing the manipulated multi-resolution image data; and
compositing the second image data of the luminance component with image data of the color component,
wherein the second image data of the luminance component are generated based on pixel values which are adjusted by using parameters in accordance with pixel values of the image data of the color component, and
wherein the second image data of the luminance component are generated by compositing the first image data of the luminance component with third image data of the luminance component, which is generated by the reconstructing, by using the parameters in accordance with the pixel values of the image data of the color component.

* * * * *